United States Patent Office 3,595,832
Patented July 27, 1971

3,595,832
HEAT INITIATED ROOM TEMPERATURE
VULCANIZABLE SILICONE ELASTOMER
John P. Szendrey, Midland, Mich., assignor to Dow
Corning Corporation, Midland, Mich.
No Drawing. Filed May 19, 1969, Ser. No. 825,967
Int. Cl. C08f 11/04
U.S. Cl. 260—46.5                            4 Claims

ABSTRACT OF THE DISCLOSURE

A mixture of a vinyl containing polydiorganosiloxane, $RHSiCl_2$, an alkoxylated silicon compound and an organic peroxide is disclosed. The mixture cures to an elastomer after receiving an initial heating step and exposure to moisture. The mixture in the absence of moisture and after the initial heating step is stable and does not cure. A method of vulcanizing the above mixture is also disclosed.

This invention relates to a room temperature vulcanizable silicone elastomer.

Room temperature vulcanizable silicone elastomers are known in the art. The room temperature vulcanizable silicone elastomers, for the most part, are sold in the form of one package and two package compositions. The one package room temperature vulcanizable silicone elastomers contain all the ingredients in one package and when the mixture in this package is exposed to moisture or air the contents will cure to an elastomer. However, in the two package room temperature vulcanizable silicone elastomer, the catalyst is usually packaged separately, either alone or with some of the other ingredients which are inert in the presence of the catalyst. The two package room temperature vulcanizable silicone elastomers cure to an elastomer by mixing the contents of the two packages. Other silicone elastomers are obtained by heating a composition which is usually catalyzed by a peroxide. In this case the composition will vulcanize as long as heating is continued but will not vulcanize if the composition is cooled below some activation temperature.

The present invention uses both a heating step and exposure to moisture at room temperature to obtain an elastomer. The composition of the present invention does not cure to an elastomer upon exposure to moisture at room temperature. The composition of the present invention also does not cure by only heating. The composition of the present invention is heated in an initiating step and then upon exposure to moisture the resulting mixture cures at room temperature.

The present invention relates to a room temperature vulcanizable composition which is curable to an elastomer upon exposure to moisture after being heated to a temperature of from 90 C. to 175° C. inclusive for at least one minute and for a time and temperature sufficient to decompose an organic peroxide into free radicals, said room temperature vulcanizable composition being flowable and stable after said heating and in the absence of moisture, consisting essentially of (A) a polydiorganosiloxane having an average of at least two vinyl radicals per molecule and no more than an average of 4 per molecule, the remaining organic radicals being selected from the group consisting of monovalent hydrocarbon radicals of 1 to 10 inclusive carbon atoms and monovalent halogenated hydrocarbon radicals of from 1 to 10 inclusive carbon atoms, said monovalent hydrocarbon and halogenated hydrocarbon radicals being free of aliphatic unsaturation, said polydiorganosiloxane being terminated by triorganosiloxy radicals and having a viscosity of from 100 to 100,000 cs. at 25° C., (B) an organosilane of the formula $RHSiCl_2$ where R is a monovalent radical selected from the group consisting of hydrocarbon radicals and halogenated hydrocarbon radicals both having from 1 to 10 inclusive carbon atoms and both being free of aliphatic unsaturation, said organosilane being present in an amount sufficient to provide from 0.9 to 1.1 silicon-bonded hydrogen atoms per vinyl radical of the polydiorganosiloxane of (A), (C) an alkoxylated silicon compound containing at least 5 weight percent alkoxy groups consisting of $R_bSi(OR'')_{4-b}$, partial hydrolyzates of $R_bSi(OR'')_{4-b}$, and mixtures thereof, where R is defined above, b is an integer of from 0 to 2 inclusive and R" is an alkyl group having from 1 to 6 inclusive carbon atoms, said alkoxylated silicon compound being present in an amount to provide from 0.75 to 2 alkoxy groups per chlorine atom in the organosilane of (B) and (D) an organic peroxide in an amount of from 0.1 to 10 weight percent based on the weight of the polydiorganosiloxane of (A).

The polydiorganosiloxane (A) of the present invention must contain an average of two vinyl radicals per molecule and can contain up to and including four vinyl radicals per molecule. The polydiorganosiloxane can have the vinyl radicals attached to the chain terminating silicon atoms or the vinyl radicals can be attached to the silicon atoms somewhere along the polymer chain or the vinyl radicals can be both on the terminal silicon atom and along the polymer chain. The other organic groups of the polydiorganosiloxane can be any of the monovalent hydrocarbon or halogenated hydrocarbon radicals having 1 to 10 carbon atoms and being free of aliphatic unsaturation. Illustrative examples of the monovalent hydrocarbon and halogenated hydrocarbon radicals include methyl, ethyl, isopropyl, butyl, propyl, pentyl, hexyl, heptyl, octyl, nonyl, decyl, phenyl, tolyl, xylyl, naphthyl, beta-phenylethyl, cyclohexyl, cyclopentyl, chloromethyl, 3,3,3-trifluoropropyl, $\alpha,\alpha,\alpha$-trifluorotolyl, bromohexyl, dichlorophenyl, chloronaphthyl, trichlorodecyl, heptafluoropentyl and chlorocyclohexyl. The polydiorganosiloxane polymer chains are terminated by triorganosiloxy groups wherein the organic groups are vinyl or the other organic radicals described above. Small amounts of other endblocking groups are not detrimental to the present invention such as alkoxy groups and hydroxyl groups, however, the concentration should be less than 0.1 weight percent based on the weight of the polydiorganosiloxane. The viscosity of the polydiorganosiloxane can vary from 100 to 100,000 cs. at 25° C., preferably from 1000 to 10,000 cs. at 25° C. The vinyl containing polydiorganosiloxanes are well known in the art and can be obtained commercially.

The organosilane (B) has a formula $RHSiCl_2$ wherein R is a monovalent hydrocarbon or halogenated hydrocarbon radical both having from 1 to 10 inclusive carbon atoms and both being free of aliphatic unsaturation. Illustrative examples of R are the same as defined above for the organic radicals of the polydiorganosiloxane. Illustrative examples of $RHSiCl_2$ include, methyldichlorosilane, ethyldichlorosilane, propyldichlorosilane, hexyldichlorosilane, octyldichlorosilane, decyldichlorosilane, phenyldichlorosilane, tolyldichlorosilane, cyclohexyldichlorosilane, (3,3,3-trifluoropropyl)dichlorosilane, ($\alpha,\alpha,\alpha$-trifluorotolyl)dichlorosilane, (dichlorophenyl)dichlorosilane, (chlorocyclohexyl)dichlorosilane and (bromohexyl)dichlorosilane. The organosilanes of (B) are well known in the art and many can be obtained commercially.

The alkoxylated silicon compound (C) can be a compound having 5 weight percent or more alkoxy groups. These alkoxylated silicon compounds can be compounds of a formula $R_bSi(OR'')_{4-b}$, partial hydrolyzates of $R_bSi(OR'')_{4-b}$ or mixtures thereof. R is defined above, $b$ is 0, 1 or 2, preferably 0 or 1, and R'' is an alkyl group of 1 to 6 carbon atoms such as methyl, ethyl, propyl, butyl, pentyl or hexyl. By "partial hydrolyzate" it is to be understood that an alkoxylated siloxane polymer is obtained by hydrolyzing with insufficient water to remove all the alkoxy groups, in the present case, 5 weight percent or more alkoxy groups are to remain on the alkoxylated siloxane polymer. Illustrative examples of the $$R_bSi(OR'')_{4-b}$$

compounds include,

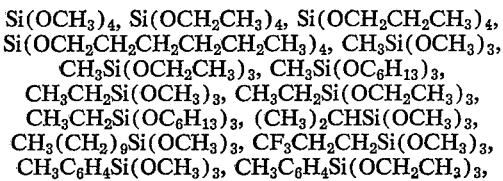

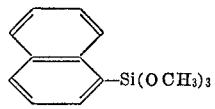

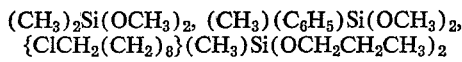

and

$BrCH_2CH_2CH_2CH_2CH_2Si(OCH_2CH_2CH_2CH_3)_3$

Partial hydrolyzates of $R_bSi(OR'')_{4-b}$ is illustrated by ethylpolysilicate and any of the above silanes where partial hydrolysis and condensation has taken place. These alkoxylated silicon compounds are well known in the art and can be purchased commercially.

The organic peroxide (D) can be of the well known organic peroxides such as tertiary butyl perbenzoate, benzoyl peroxide, 2,4-dichlorobenzoyl peroxide, ditertiarybutyl peroxide, dicumyl peroxide, and 2,5-bis(tertbutyl peroxy)-2,5-dimethylhexane. The organic peroxides are well known and can be purchased commercially. The type of organic peroxide is not critical and thus any are satisfactory for this invention.

The ingredients (A), (B), (C) and (D) can be mixed in any order. The ingredients are mixed to provide from 0.9 to 1.1 silicon-bonded hydrogen atoms of (B) per vinyl radical in the polydiorganosiloxanes of (A), from 0.75 to 2 alkoxy groups in (C) per chlorine atom in the organosilane of (B) and from 0.1 to 10 weight percent organic peroxide based on the weight of the polydiorganosiloxane (A). The preferred composition contains from 0.95 to 1.05 silicon-bonded hydrogen atoms of (B) per vinyl radical in the polydiorganosiloxane of (A), from 0.9 to 1.5 alkoxy groups in (C) per chlorine atom in the organosilane of (B) and 2 to 5 weight percent organic peroxide based on the weight of the polydiorganosiloxane (A).

The mixture of (A), (B), (C) and (D) is prepared in the absence of moisture and at a low temperature to avoid decomposing the organic peroxide. However, (A), (B) and (C) can be mixed at a higher temperature and then cooled before (D) is added. After the mixture is prepared, the composition can be stored in a container which does not permit exposure to moisture. The exposure of the mixture to moisture at room temperature results in a mixture of gelled particles in a fluid polymer. Such an exposed mixture will not cure to a useful elastomer by either heating or further exposure to moisture.

The mixture of (A), (B), (C) and (D) requires an initial heating step to cause the mixture when exposed to moisture to cure to a useful elastomer. The initial heating step is carried out by heating the mixture in the absence of moisture to a temperature of from 90° C. to 175° C. for at least one minute. The time and temperature must be sufficient to decompose the organic peroxide to form free radicals. For example, 10 minutes at 150° C. is usually sufficient for the initial heating step.

After the heating step has been carried out, the resulting mixture will remain stable in the absence of moisture and thus can be stored in moisture tight containers, but will cure to a useful elastomer when exposed to moisture.

Thus, the mixture of (A), (B), (C) and (D) can be cured to an elastomer by heating in the absence of moisture at a temperature of from 90° C. to 175° C. for at least one minute and for a time and temperature sufficient to decompose an organic peroxide into free radicals and by then exposing the resulting mixture to ambient air for a time sufficient to obtain a cured elastomer. Usually, the mixture of (A), (B), (C) and (D) is heated and stored at ambient temperature in the absence of moisture until needed and then when an elastomer is desired the mixture is exposed to moisture at room temperature. The heated mixture will remain stable over long periods of time without curing in the absence of moisture. The mixture once heated is then stored at ambient temperatures.

The room temperature vulcanizable compositions of this invention can contain fillers, such as silica, diatomaceous earth, crushed quartz and the like such as conventionally used in silicone elastomers. Other conventional additives can also be used.

It may be advantageous to use a room temperature catalyst to enhance the curing of the mixture at room temperature. The catalyst for alkoxylated mixtures are well known and include organic tin salts, titanates and certain other metal salts. These catalysts can be added to the initial composition or can be added after the heating step or just before use.

The room temperature vulcanizable compositions of the present invention are curable to elastomers which find utility as sealants, potting compositions, coating compositions, encapsulants and the like.

The following examples are illustrative only and should not be construed as limiting the present invention which is properly delineated in the claims.

EXAMPLE 1

A mixture of 10 g. of a vinylmethylphenylsiloxy endblocked polydimethylsiloxane having a viscosity of 2000 cs. at 25° C., 0.2 g. of ethylorthosilicate, 0.2 g. of methyldichlorosilane and six drops of tertiary-butyl perbenzoate was prepared and placed in a closed container. The mixture was heated for 10 minutes at 150° C. A portion of the resulting mixture was placed in an aluminum cup and exposed to 50% relative humidity air at room temperature for 20 hours. A cured elastomer was obtained. The mixture remaining in the closed container was unchanged and was still a flowable liquid.

EXAMPLE 2

A mixture of 10 g. of the vinylmethylphenylsiloxy endblocked polydimethylsiloxane described in Example 1, 0.1 g. of ethylorthosilicate, 0.11 g. of methyldichlorosilane, and six drops of tertiary butyl perbenzoate was prepared. The mixture was placed in a closed container and heated for 5 minutes at 150° C. The resulting mixture was then exposed to 50% relative humidity air at room temperature. A cured elastomer was obtained after 2 days.

EXAMPLE 3

When a mixture of 100 g. of vinyldimethylsiloxy endblocked polydimethylsiloxane having a viscosity of 1000 cs. at 25° C., 1.41 g. of methyldichlorosilane, 1.27 g. of ethylorthosilicate and 2 g. of 2,4-dichlorobenzoyl peroxide is prepared in the absence of moisture, heated for 15 minutes at 115° C. and then cooled to room temperature, exposed to ambient air at room temperature for 24 hours, a cured elastomer is obtained.

EXAMPLE 4

When the following mixtures are prepared and treated as described in Example 3, cured elastomers are obtained.

(A)

100 g. of the polydimethylsiloxane of Example 3
1.27 g. of methyldichlorosilane
0.76 g. of ethylorthosilicate
1.0 g. of 2,4-dichlorobenzoyl peroxide (B)

100 g. of the polydimethylsiloxane of Example 3
1.55 g. of methyldichlorosilane
2.11 g. of ethylorthosilicate
5 g. of 2,4-dichlorobenzoyl peroxide (C)

100 g. of the polydimethylsiloxane of Example 3
1.41 g. of methyldichlorosilane
2.54 g. of ethylorthosilicate
10 g. of 2,4-dichlorobenzoyl peroxide

EXAMPLE 5

When a mixture of 100 g. of a vinylhexylmethylsiloxy endblocked polydimethylsiloxane having a viscosity of 100 cs. at 25° C., 6.8 g. of phenyldichlorosilane, 3.46 g. of methyltrimethoxysilane and 4 g. of 2,5-bis(tertiarybutylperoxy)-2,5-dimethylhexane is prepared in the absence of moisture, heated for 30 minutes at 171° C. and then cooled to room temperature, exposed to ambient air at room temperature for 4 days, a cured elastomer is obtained.

EXAMPLE 6

When a mixture of 100 g. of a trimethylsiloxy endblocked polydimethylsiloxane having an average of 4 methylvinylsiloxane units per molecule and a viscosity of 100,000 cs. at 25° C., 0.7 g. of ethyldichlorosilane, 2.44 g. of ethylpolysilicate having 20 weight percent ethoxy groups and 3 g. of benzoyl peroxide is prepared in the absence of moisture, heated for one hour at 126° C. and then cooled to room temperature, exposed to ambient air at room temperature for 7 days, a cured elastomer is obtained.

EXAMPLE 7

When a mixture of 100 g. of a vinylidimethylsiloxy endbolcked polydiorganosiloxane having 95 mol percent dimethylsiloxane units and 5 mol percent phenylmethylsiloxane units and a viscosity of 10,000 cs. at 25° C., 1.28 g. of decyldichlorosilane, 1.14 g. of hexylorthosilicate and 5 g. of ditertiarybutyl peroxide is prepared in the absence of moisture, heated for 20 minutes at 175° C., cooled to room temperature and then exposed to 60% relative humidity air at room temperature 24 hours, a cured elastomer is obtained.

That which is claimed is:

1. A room temperature vulcanizable composition which is curable to an elastomer upon exposure to moisture after being heated to a temperature of form 90° C. to 175° C. inclusive for at least one minute and for a time and temperature sufficient to decompose an organic peroxide into free radicals, said room temperature vulcanizable composition being flowable and stable after said heating and in the absence of moisture, consisting essentially of
    (A) a polydiorganosiloxane having an average of at least two vinyl radicals per molecule and no more than an average of 4 per molecule, the remaining organic radicals being selected from the group consisting of monovalent hydrocarbon radicals of 1 to 10 inclusive carbon atoms and monovalent halogenated hydrocarbon radicals of from 1 to 10 inclusive carbon atoms, said monovalent hydrocarbon and halogenated hydrocarbon radicals being free of aliphatic unsaturation, said polydiorganosiloxane being terminated by triorganosiloxy radicals and having a viscosity of from 100 to 100,000 cs. at 25° C.,
    (B) an organosilane of the formula $RHSiCl_2$ where R is a monovalent radical selected from the group consisting of hydrocarbon radicals and halogenated hydrocarbon radicals both having from 1 to 10 inclusive carbon atoms and both being free of aliphatic unsaturation, said organosilane being present in a amount sufficiet to provide from 0.9 to 1.1 silicon-bonded hydrogen atoms per vinyl radical of the polydiorganosiloxane of (A),
    (C) an alkoxylated silicon compound containing at least 5 weight percent alkoxy groups selected from the group consisting of $R_bSi(OR'')_{4-b}$, partial hydrolyzates of $R_bSi(OR'')_{4-b}$, and mixtures thereof, where R is defined above, $b$ is an integer of from 0 to 2 inclusive and R'' is an alkyl group having from 1 to 6 inclusive carbon atoms, said alkoxylated silicon compound being present in an amount to provide from 0.75 to 2 alkoxy groups per chlorine atom in the organosilane of (B) and
    (D) an organic peroxide in an amount of from 0.1 to 10 weight percent based on the weight of the polydiorganosiloxane of (A).

2. The room temperature vulcanizable composition in accordance with claim 1 wherein (A) is a vinyl terminated polydimethylsiloxane having a viscosity of from 1000 to 10,000 cs. at 25° C., (B) is $(CH_3)HSiCl_2$, (C) is ethylorthosilicate and (D) is teritary butyl perbenzoate.

3. A method of vulcanizing a room temperature vulcanizable composition consisting essentially of
    (I) heating in the absence of moisture at a temperature of from 90° C. to 175° C. for at least one minute and for a time and temperature sufficient to decompose an organic peroxide into free radicals, a mixture of
        (A) a polydiorganosiloxane having an average of at least two vinyl radicals per molecule and no more than an average of 4 per molecule, the remaining organic radicals being selected from the group consisting of monovalent hydrocarbon radicals of 1 to 10 inclusive carbon atoms and monovalent halogenated hydrocarbon radicals of from 1 to 10 inclusive carbon atoms, said monovalent hydrocarbon and halogenated hydrocarbon radicals being free of aliphatic unsaturation, said polydiorganosiloxane being terminated by triorganosiloxy radicals and having a viscosity of from 100 to 100,000 cs. at 25° C.,
        (B) an organosilane of the formula $RHSiCl_2$ where R is a monovalent radical selected from the group consisting of hydrocarbon radicals and halogenated hydrocarbon radicals both having from 1 to 10 inclusive carbon atoms and both being free of aliphatic unsaturation, said organosilane being present in an amount sufficient to provide from 0.9 to 1.1 silicon-bonded hydrogen atoms per vinyl radical of the polydiorganosiloxane of (A),
        (C) an alkoxylated silicon compound containing at least 5 weight percent alkoxy groups selected from the group consisting of $R_bSi(OR'')_{4-b}$, partial hydrolyzates of $R_bSi(OR'')_{4-b}$, and mixtures thereof, where R is defined above, $b$ is an integer of from 0 to 2 inclusive and R'' is an alkyl group having from 1 to 6 inclusive carbon atoms, said alkoxylated silicon compound being present in an amount to provide from 0.75 to 2 alkoxy groups per chlorine atom in the organosilane of (B) and (D) an organic peroxide in an amount of from 0.1 10 weight percent based on the weight of the polydiorganosiloxane of (A), (II) exposing the resulting mixture formed in (I) to ambient air for a time sufficient to obtain a cured elastomer.

4. The method in accordance with claim 3 in which the resulting mixture of (I) is cooled to ambient temperature in the absence of moisture before exposure step (II).

No references cited.

DONALD E. CZAJA, Primary Examiner

M. I. MARQUIS, Assistant Examiner

U.S. Cl. X.R.

117—161ZA; 260—37SB, 46.5UA